W. DALE.

Assignor to the DALE TILE MANUFACTURING Co.,—(Limited.)

Covers for Openings in Sidewalks.

No. 8,365. Reissued Aug. 6, 1878.

WITNESSES

J. A. Rutherford

Vinton Coombs

INVENTOR,

William Dale,

By J. J. Coombs,

ATTORNEY.

UNITED STATES PATENT OFFICE

WILLIAM DALE, OF NEW YORK, N. Y., ASSIGNOR TO THE DALE TILE MANUFACTURING COMPANY, (LIMITED,) OF SAME PLACE.

IMPROVEMENT IN COVERS FOR OPENINGS IN SIDEWALKS.

Specification forming part of Letters Patent No. 112,428, dated March 7, 1871; Reissue No. 5,684, dated December 16, 1873; Reissue No. 8,295, dated June 25, 1878; Reissue No. 8,365, dated August 6, 1878; application filed July 20, 1878.

*To all whom it may concern:*

Be it known that I, WILLIAM DALE, of the city, county, and State of New York, have invented a new and useful Improvement in Covers for Openings in Sidewalks; and I do hereby declare that the following is a full, clear, and exact description of the same, reference being had to the annexed drawings, making part of this specification, in which—

Figure 1:
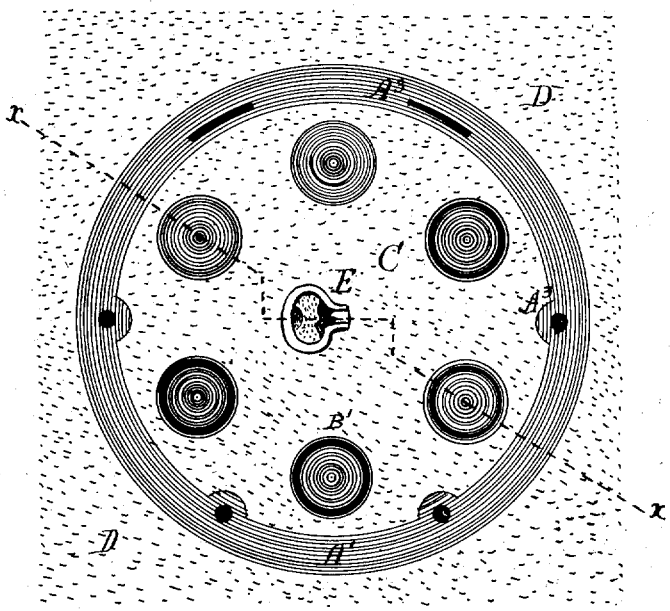
Figure 2:
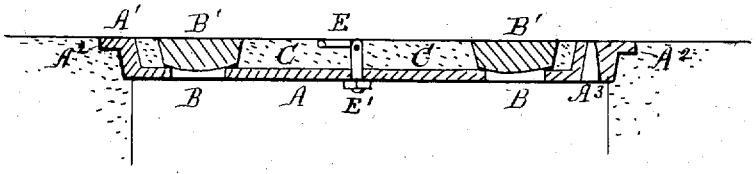

Figure 1 is a plan view, and Fig. 2 is a vertical section on the line *x x* of Fig. 1.

The same letters in both the figures refer to the same parts.

This invention relates to such covers as are used for covering openings from sidewalks into vaults to exclude water and admit light.

Such illuminating vault-covers have heretofore been made by using a frame of cast-iron with cross-bars similar to a window-sash, with openings between the bars for inserting thick panes of glass, or a cast-iron plate with holes for the reception of glass bull's-eyes, the cast-iron in either case being flush with the upper surface of the glass, or nearly so, and the cast-iron and the glass forming the upper surface of the cover. Into and over said openings or holes the panes of glass or bull's-eyes were inserted, and secured therein by putty or some suitable cement in the narrow spaces between the glass and the surrounding metal.

The cast-iron being flush with the glass, or nearly so, would soon become polished and slippery from use, and thus afford but an insecure foothold. Furthermore, the iron expanding and contracting with the changes of temperature unequally with the glass, the panes of glass were liable to be crushed or thrown out of place by this cause, or at least to become loosened, so as to render the cover leaky.

To remedy these defects I make my metallic frame in the form of a shallow dish, A, with a level bottom having a vertical rim, $A^1$, the thickness of the glass bull's-eyes to be used therein, and a horizontally-projecting flange, $A^2$, to bear upon a proper seat formed in the pavement D. In said bottom illuminating-holes B are made at suitable intervals, over which are placed glass bull's-eyes B′, so as to cover and close them. Then all the spaces within the rim and between the bull's-eyes I fill with any material or composition, C, in a plastic state, suitable for a foot-pavement, which will not become polished and slippery from use, and which will not expand and contract from changes of temperature materially more or less than glass, and which, on hardening, will hold the glass bull's-eyes firmly in place, forming tight joints around them. The glass bull's-eyes B, the intermediate filling C, with the metal rim $A^1$, thus form the upper surface of the cover, which is not liable to become slippery like polished cast-iron, and the glass bull's-eyes and the intermediate filling will not expand and contract so unequally as to endanger the crushing or loosening of the glass.

A ring, E, attached to an eyebolt, E′, may be countersunk, so that when not in use it will lie flush with the surface of the filling C.

For the purpose of ventilation, openings, as at $A^3$, may be made through the vertical rim $A^1$.

I do not claim, broadly, an illuminating vault-cover having the metallic portion of the surface coated with natural or artificial asphalt or other equivalent material to prevent slipping; but

What I claim as my invention, and desire to secure by Letters Patent, is—

1. A cover for openings in pavements consisting of a metallic plate, A, with vertical rim $A^1$, illuminating-holes B covered by glass bull's-eyes B′, and having the intermediate space within the rim and between the bull's-eyes filled with a material or composition suitable for a foot-pavement applied in a plastic state, the same being so constructed that the glass bull's-eyes, the surrounding metal rim, and intermediate filling will form substantially the upper surface of the cover.

2. A cover for openings in pavements consisting of a metallic plate, A, having a vertical rim, $A^1$, with vent-holes $A^3$ therein, illuminating-holes B, covered by glass bull's-eyes B′, and the intermediate filling C, substantially as described.

In testimony that I claim the foregoing as my invention I hereto subscribe my name this 18th day of July, 1878.

WILLIAM DALE.

Witnesses:

CHAS. P. READ,

I. M. HOLLY.